(12) United States Patent
Lebron

(10) Patent No.: US 8,413,494 B1
(45) Date of Patent: Apr. 9, 2013

(54) BURNER PRESSURE TRANSDUCER

(75) Inventor: Jose M. Lebron, Manchester, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 0 days.

(21) Appl. No.: 13/353,517

(22) Filed: Jan. 19, 2012

(51) Int. Cl.
*G01M 15/00* (2006.01)

(52) U.S. Cl.
USPC ...................................................... 73/112.01

(58) Field of Classification Search ................ 73/112.01
See application file for complete search history.

(56) References Cited

U.S. PATENT DOCUMENTS

| | | | |
|---|---|---|---|
| 6,892,584 B2 * | 5/2005 | Gilkison et al. | 73/736 |
| 7,334,467 B1 * | 2/2008 | DuPuis et al. | 73/170.02 |
| 7,490,510 B2 * | 2/2009 | Agami et al. | 73/170.02 |
| 8,256,284 B2 * | 9/2012 | Vozhdaev et al. | 73/170.02 |
| 2003/0128736 A1 * | 7/2003 | Dalio et al. | 374/141 |

* cited by examiner

*Primary Examiner* — Freddie Kirkland, III
(74) *Attorney, Agent, or Firm* — Kinney & Lange, P.A.

(57) ABSTRACT

A sensor for measuring gas pressure in a gas turbine engine. The sensor is positioned to receive pressurized gas and measure the pressure. A thermally insulating material mounts the sensor spaced from conductive portions of the engine. A heater is mounted on a plurality of sides of the sensor to provide heat thereto. A thermal blanket covers the heater to prevent loss of sensor heat.

20 Claims, 2 Drawing Sheets

BURNER PRESSURE TRANSDUCER

BACKGROUND

Gas turbine engines often operate in an atmosphere that has a low temperature, below freezing. As a result, pneumatic parts of the engines that have moist air are likely to freeze if steps aren't taken to prevent freezing.

For example, the burner pressure sense line runs from a diffuser case port or burner pressure source to a remote sensor location such as the electronic engine control (EEC) housing. Blockages anywhere in this pneumatic sensing system can result in an erroneous burner pressure signal, which is used to control engine thrust. In some cases, this results in a loss of thrust control which may be a significant safety issue. One common cause of pneumatic sense line blockage is the accumulation of moisture in the presence of freezing ambient conditions. This results in blockage of burner pressure passages, preventing the burner pressure signal from reaching the sensor's diaphragm.

Prior art methods have used water traps and weep holes to remove moisture, but have not been completely successful. Many burner pressure sensing systems include screens to protect the sensor from Foreign Object Damage (FOD) and contaminates in the burner pressure air. However, the screens themselves can become a collection point for moisture preventing it from draining out of the EEC.

While efforts are made to remove moisture from the pneumatic sense line, those efforts are not always successful and moisture does reach the sensors.

Some turbofan jet engines utilize burner pressure smart transducers to monitor the pressure in the burner. In flight as noted above, these transducers are exposed to freezing temperatures. These cold temperatures cause air moisture to condense inside the sensor. The condensate can freeze, causing an obstruction of the interior passages that will prevent the sensor's diaphragm from sensing pressure changes.

Currently a heater is utilized on or in the pneumatic sensor. Tests have shown, however, that the heater is inefficient at providing heat where is needed to prevent freezing at the sensor's sensing system. It also does not significantly reduce air moisture condensation.

SUMMARY

It has now been discovered that low temperature environmental problems on pneumatic sensors like for example, for measuring burner pressure in turbofan jet engines, can be obviated using the device of this invention. Specifically, the invention includes the use of a heater that contacts the sensor on more than one side. Also provided is a thermal blanket or cover over the heater. A thermal break is placed between the EEC housing and the mating surface of the sensor. Thus an increased amount of heat is provided to critical areas while reducing heat loss dissipated to the sensor's environment and mating surfaces.

DETAILED DESCRIPTION

Figure 1:
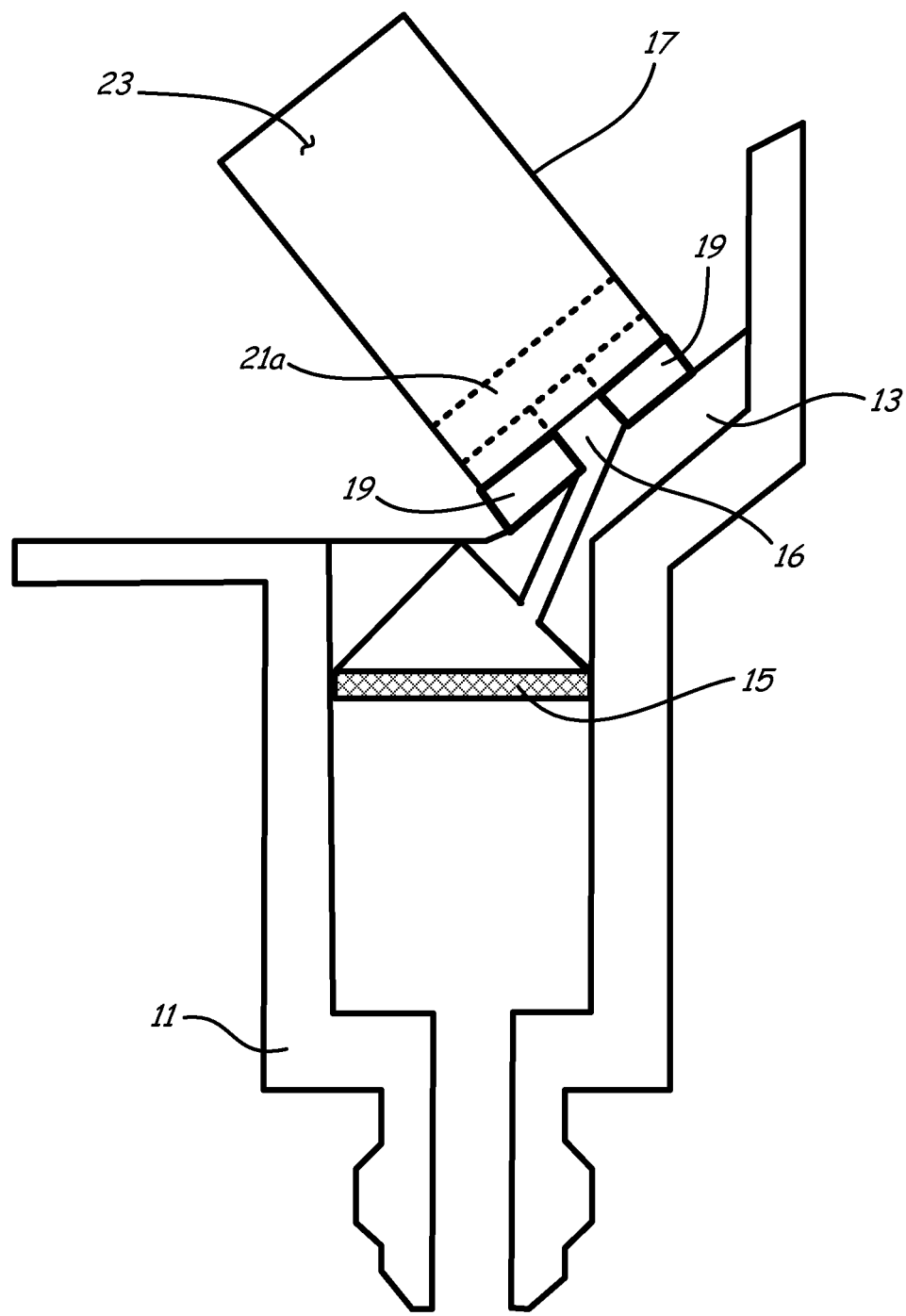
FIG. 1 is a schematic view of the pressure sensor of this invention in operational relationship with a pressure port.

As shown in FIG. 1, a gas turbine engine pressure port 11 is attached to or integral with an electronic engine control housing 13. Pressure passes through screen 15 to prevent particles from impacting on the sensor. Filtered pressure gas then passes along tube 16 to sensor 17. Sensor 17 is mounted on insulating material 19 that provides a thermal break from EEC housing 13.

Figure 2:
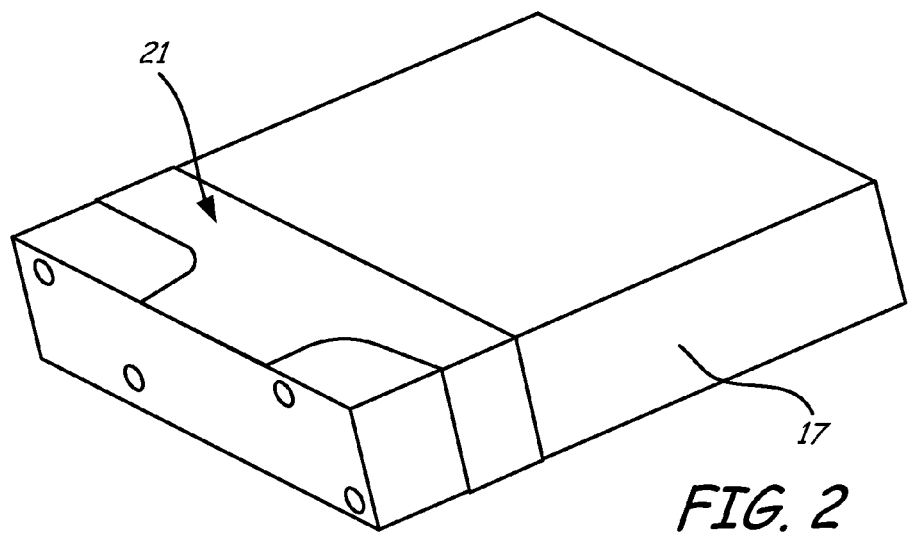
FIG. 2 is a perspective view of the sensor with a heater.

Sensor 17 is fitted with a heater 21 as shown in FIG. 2. Heater 21 contacts the top, bottom and two sides of sensor 17, and is therefore able to provide heat to the entire sensor diaphragm. The size of heater 21 will depend on the anticipated environment where it will be needed, the amount of heat available from heater 21, as well as the specific size and shape of sensor 17. More or less of sensor 17 can be covered by heater 21, depending on needs. In FIG. 2, heater 21 is positioned on sensor 17 at the end closest to the electronic engine control housing EEC which in prior systems operates as a heat sink, drawing heat from sensor 17.

In FIG. 1, heater 21 is completely covered with a thermal blanket 23.

Figure 3:
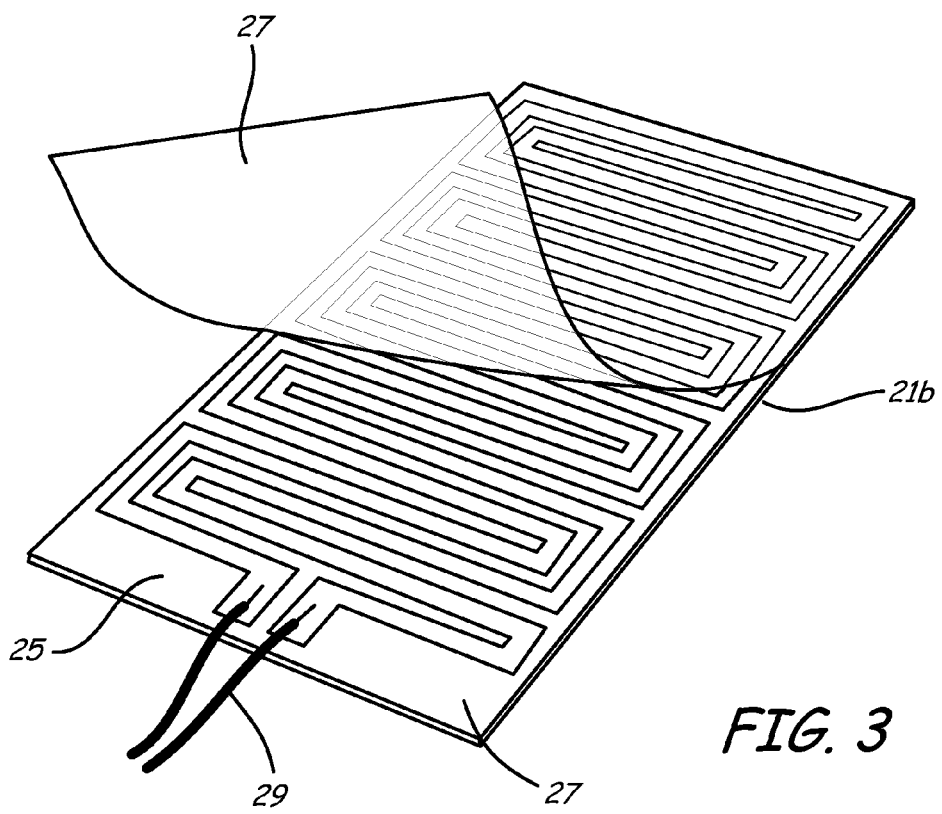
FIG. 3 is a perspective view, partially cutaway, showing a heater.

Heater 21 can be any commercially available heater that is sized to contact sensor 17. One heater that is effective in contacting the portions of sensor 17 is a Thermofoil™ Flexible heater manufactured by Minco Co. FIG. 3 illustrates such a heater 21b where an etched foil resistive element 25 is laminated between two layers of flexible insulation 27. It is powered by a conventional source of electrical energy, not shown, via electrical wires 29. Because it is flexible, it can be placed on sensor 17 in any manner, such as that shown in FIG. 2, for example.

A wide variety of materials for thermal blanket 23 can be used, as long as they function to insulate heater 21. The thermal blanket can be formed from glass or silica, or other insulating materials. One thermal blanket that is effective is Min-K® Microporous insulation, manufactured by Morgan Thermal Ceramics. Thermal break insulation material 19 can be any effective insulating material. One material that has been effective is a polycarbonate resin such as Lexan® (Aircraft Grade Polycarbonate). If a metal to metal thermal break is desired, an alternative material is Stainless Steel 304.

The present invention increases heater power and heater-to-sensor contact areas while reducing thermal losses through the use of the thermal blanket 23 and housing thermal break 19. Stagnant pressure sensor readings due to blockage of the sensor's interior passages because of condensate freezing in sensor 17 are eliminated. Not only is more heat added, substantially no heat dissipates to the electronic engine control housing 13 due to insulating material 19 separating sensor 17 from EEC housing 13.

FIG. 1 illustrates the operation of the system of this invention where the combination of EEC pressure port 11, screen 15, and tube 16 permit sensor 17 to accurately measure pressure while reducing heat losses to the environment. Tube 16 serves to transmit the burner pressure gas from the EEC pressure port 11 to sensor 17. Heat is maintained by heater 21 on the surroundings of the sensor's 17 diaphragm, as seen in FIG. 2, along with insulation material 23. This configuration reduces heat losses due to cool portions of the EEC housing, and surrounding air.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A sensor for measuring pressure in a gas turbine engine, the sensor comprising:
   a sensor positioned to receive a pressurized gas and measure the pressure in a gas turbine engine;
   thermally insulating material mounting the sensor spaced from thermally conductive portions of the engine;
   a heater mounted on a plurality of sides of the sensor to provide heat thereto; and
   a thermal blanket covering the heater.

2. The sensor of claim 1, wherein the heater is electrically heated.

3. The sensor of claim 2, wherein the heater comprises an etched-foil resistive element between layers of flexible insulation.

4. The sensor of claim 1, wherein the thermal blanket is formed from glass or silica fibers.

5. The sensor of claim 1, wherein the thermally insulating material is formed from polycarbonate resin.

6. A system for measuring pressure in a gas turbine engine, the system comprising:
   a source of gas pressure;
   a sensor positioned to receive pressurized gas from the source and measure the pressure;
   thermally insulating material mounting the sensor spaced from thermally conductive portions of the engine;
   a heater mounted on a plurality of sides of the sensor to provide heat thereto; and
   a thermal blanket covering the heater.

7. The system of claim 6, wherein the heater is electrically heated.

8. The system of claim 7, wherein the heater comprises an etched-foil resistive element between layers of flexible insulation.

9. The system of claim 6, wherein the thermal blanket is formed from glass or silica fibers.

10. The system of claim 6, wherein the thermally insulating material is formed from polycarbonate resin.

11. The system of claim 6, which further includes a filter positioned between the source of burner pressure gas and the sensor.

12. The system of claim 11, wherein the sensor is installed in an electronic engine control housing, and the system further comprises a passage for pressurized gas to flow from a pressure port to the sensor.

13. A method for thermal management of a pressure sensing system in a gas turbine engine, comprising:
   positioning a sensor to receive pressurized gas and measure the pressure;
   spacing the sensor from conductive portions of the engine using thermally insulating material to mount the sensor;
   placing the sensor in contact with a heater on a plurality of sides of the sensor to provide heat thereto; and
   covering the sensor with a thermal blanket.

14. The method of claim 13, wherein the heater is electrically heated.

15. The method of claim 14, wherein the heater comprises an etched-foil resistive element between layers of flexible insulation.

16. The method of claim 13, wherein the thermal blanket is formed from glass or silica fibers.

17. The method of claim 13, wherein the thermally insulating material is formed from polycarbonate resin.

18. The method of claim 13, which further includes positioning a filter between the source of burner pressure gas and the sensor.

19. The method of claim 18, which further includes establishing a passage for the pressurized gas to flow from a pressure port configured to receive the pressurized gas to the sensor.

20. The method of claim 13, wherein the sensor is mounted on an electronic engine control housing the thermally insulating material.

* * * * *